US011953032B2

(12) United States Patent
Speichinger et al.

(10) Patent No.: US 11,953,032 B2
(45) Date of Patent: Apr. 9, 2024

(54) HYDRAULIC PUMP OR MOTOR WITH MOUNTING CONFIGURATION FOR INCREASED TORQUE

(71) Applicant: Caterpillar Inc., Peoria, IL (US)

(72) Inventors: Justin Douglas Speichinger, Morton, IL (US); Ramalho Stive, Isle D'Abeau (FR); Darren Joseph Hopf, Peoria, IL (US); Aurelien Herve Bernard, Montbonnot (FR); Paul Alan Rousseau, Clayton, NC (US)

(73) Assignee: Caterpillar Inc., Peoria, IL (US)

( * ) Notice: Subject to any disclaimer, the term of this patent is extended or adjusted under 35 U.S.C. 154(b) by 196 days.

(21) Appl. No.: 17/171,416

(22) Filed: Feb. 9, 2021

(65) Prior Publication Data

US 2022/0252087 A1 Aug. 11, 2022

(51) Int. Cl.
*F15B 15/08* (2006.01)
*F04D 25/04* (2006.01)

(52) U.S. Cl.
CPC .............. *F15B 15/08* (2013.01); *F04D 25/04* (2013.01)

(58) Field of Classification Search
CPC ................................ F15B 15/08; F04D 25/04
USPC ........................................................ 417/405
See application file for complete search history.

(56) References Cited

U.S. PATENT DOCUMENTS 2,965,040 A * 12/1960 Eisenberg ........... F04C 15/0026 418/152
3,407,742 A * 10/1968 Mitchell ............. F01C 21/0809 418/268
3,787,014 A * 1/1974 Story ....................... H02K 5/00 310/91
3,817,665 A * 6/1974 Myers ..................... F04C 2/088 418/189
4,225,186 A 9/1980 Stratton
4,501,536 A * 2/1985 Middlekauff ........... F01C 20/08 418/61.3

(Continued)

FOREIGN PATENT DOCUMENTS

CN 203430675 U 2/2014
CN 107859635 3/2018

(Continued)

OTHER PUBLICATIONS

Texas Flange Product Catalog: Ver 5.00, TexasFlange.com, Jun. 2019, Retrieved from May 23, 2020 capture https://web.archive.org/web/20200523222344/https://www.texasflange.com/wp-content/uploads/2019/06/catalog-c-v5.pdf (Year: 2019).*

(Continued)

*Primary Examiner* — Devon C Kramer
*Assistant Examiner* — Benjamin Doyle
(74) *Attorney, Agent, or Firm* — Schwegman Lundberg & Woessner, P.A.

(57) ABSTRACT

A hydraulic pump or motor includes a mounting flange that is disposed at the first end of the housing. The mounting flange defines a pair of bolt receiving slots that are disposed along the X-axis on either side of the shaft. The pair of bolt receiving slots each define a radius center that are spaced away from each other a X dimension, and a pilot projection extends longitudinally away from the mounting flange, defining a pilot projection diameter. A ratio of the X dimension to the pilot projection diameter ranges from 1.1 to 1.5.

20 Claims, 9 Drawing Sheets

(56) References Cited

U.S. PATENT DOCUMENTS

| | | | | | |
|---|---|---|---|---|---|
| 4,586,885 | A * | 5/1986 | Middlekauff | F04C 2/103 418/61.3 |
| 4,601,378 | A * | 7/1986 | Pierce | F16D 27/00 192/115 |
| 5,018,397 | A * | 5/1991 | Matich | G01D 5/00 73/866.5 |
| 5,423,183 | A * | 6/1995 | Folsom | F16H 39/32 60/413 |
| 5,645,343 | A | 7/1997 | Rinehimer | |
| 5,645,363 | A | 7/1997 | Dafforn et al. | |
| 5,847,471 | A * | 12/1998 | Morishita | F02N 15/00 290/38 A |
| 6,158,302 | A * | 12/2000 | Becker | F16H 57/025 74/606 R |
| 6,398,521 | B1 * | 6/2002 | Yorulmazoglu | F04D 29/044 417/423.6 |
| 6,406,271 | B1 * | 6/2002 | Valentin | F04B 1/126 91/499 |
| 6,481,388 | B1 | 11/2002 | Yamamoto | |
| 6,688,858 | B1 * | 2/2004 | Boone | F04B 1/2064 417/269 |
| 6,742,816 | B2 | 6/2004 | Rocheleau | |
| 7,695,252 | B2 | 4/2010 | Sakikawa | |
| 11,168,772 | B2 * | 11/2021 | Mathers | F16H 39/04 |
| 11,255,193 | B2 * | 2/2022 | Mathers | F01C 21/0881 |
| 2004/0226617 | A1 | 11/2004 | Arentsen et al. | |
| 2009/0056123 | A1 | 3/2009 | Phillips et al. | |
| 2009/0280021 | A1 * | 11/2009 | Mathers | F01C 21/0863 418/184 |
| 2016/0039277 | A1 * | 2/2016 | Falls | H02K 7/006 310/58 |
| 2016/0084321 | A1 * | 3/2016 | Mihajlovic | F16D 25/0632 192/66.22 |
| 2017/0191499 | A1 * | 7/2017 | Chrabascz | F04D 29/526 |
| 2018/0162382 | A1 * | 6/2018 | Colavincenzo | B60W 10/30 |
| 2020/0070644 | A1 * | 3/2020 | Tigue | B62D 55/06 |
| 2021/0388825 | A1 * | 12/2021 | Watt | B60K 1/00 |

FOREIGN PATENT DOCUMENTS

| | | | | |
|---|---|---|---|---|
| CN | 107859635 A | | 3/2018 | |
| CN | 104295479 | | 7/2018 | |
| CN | 104295479 B | | 7/2018 | |
| CN | 208203654 U | | 12/2018 | |
| CN | 112145450 | | 12/2020 | |
| EP | 2059674 | | 8/2018 | |
| EP | 2059674 B1 | | 8/2018 | |
| EP | 3539876 | | 9/2019 | |
| EP | 3539876 A1 | | 9/2019 | |
| GB | 2101220 | | 1/1983 | |
| GB | 2101220 A | | 1/1983 | |
| RU | 2101586 C1 | * | 1/1998 | F04C 14/20 |
| RU | 2101586 C1 | | 1/1998 | |
| RU | 2505713 C1 | | 1/2014 | |
| SU | 1048129 A1 | | 10/1983 | |

OTHER PUBLICATIONS

Flange Faces, saVRee 3D Interactive Media, Nov. 25, 2020, https://web.archive.org/web/20201125173751/https://savree.com/en/encyclopedia/flange-faces.*

Written Opinion and International Search Report for Int'l. Patent Appln. No. PCT/US2022/015187, dated May 3, 2022 (10 pgs).

Written Opinion and International Search Report for Int'l. Patent Appln. No. PCT/US2022/015165, dated May 31, 2022 (13 pgs).

"U.S. Appl. No. 17/171,473, Non Final Office Action dated Apr. 13, 2023", 23 pgs.

"U.S. Appl. No. 17/171,473, Response filed Jul. 12, 2023 to Non Final Office Action dated Apr. 13, 2023", 16 pgs.

"U.S. Appl. No. 17/171,473, Final Office Action dated Oct. 3, 2023", 23 pgs.

"International Application Serial No. PCT US2022 015187, International Search Report and Written Opinion dated May 3, 2022", 8 pgs.

"International Application Serial No. PCT US2022 015165, International Search Report and Written Opinion dated May 31, 2022", 11 pgs.

Casappa Polaris, "Hydraulic Gear Pumps and Motors", (May 4, 2023), 92 pgs.

* cited by examiner

HYDRAULIC PUMP OR MOTOR WITH MOUNTING CONFIGURATION FOR INCREASED TORQUE

TECHNICAL FIELD

The present disclosure relates to hydraulic pumps or motors that are used in engine assemblies and the like. Specifically, the present disclosure relates to a mounting configuration for such pumps or motors that allows a shaft of the pump or motor to accommodate increased torque.

BACKGROUND

Engine assemblies often employ hydraulic pumps or motors that provide hydraulic oil at high pressures, or convert hydraulic oil at high pressures or high flow rates to high torque supplied by the shaft. Some hydraulic pumps or motors are coupled to a fan that moves air through a radiator to cool the cooling fluid that is used to cool the engine. One way to increase the cooling efficiency of the cooling system, is to run the fan faster, requiring more torque and typically a larger hydraulic motor and/or pump.

However, there may be limited space in the engine compartment, and/or it may be more costly to employ a larger hydraulic motor and/or pump, making the use of such a motor and/or pump impractical. Also, it may be desirable to retrofit engines already in the field with a more robust motor without changing the design of the engine significantly.

As can be seen, there currently exists a tradeoff between improved cooling efficiency for the cooling system of an engine, and the cost and/or size of the hydraulic motor.

SUMMARY

A hydraulic pump or motor with a mounting configuration for increased torque according to an embodiment of the present disclosure is provided. The pump or motor may comprise a shaft defining a longitudinal axis, a Y-axis extending upwardly and orthogonally from the longitudinal axis, and an X-axis extending orthogonally to the longitudinal axis, and the Y-axis. A housing may define a first longitudinal end, a second longitudinal end, and a cavity that extends from the first longitudinal end to the second longitudinal end. A plurality of mechanical components including one hydraulic interacting component may be disposed in the cavity, and a manifold cap may be attached to the second longitudinal end that defines an inlet and an outlet. The shaft may extend from the cavity past the first longitudinal end of the housing, and a mounting flange may be disposed at the first longitudinal end of the housing. The mounting flange may define a pair of bolt receiving slots that are disposed along the X-axis on either side of the shaft, and the pair of bolt receiving slots may each define a radius center that are spaced away from each other a X dimension. A pilot projection may extend longitudinally away from the mounting flange, defining a pilot projection diameter, and a ratio of the X dimension to the pilot projection diameter may range from 1.1 to 1. 5.

A hydraulic pump or motor with a mounting configuration for increased torque according to another embodiment of the present disclosure is provided. The pump or motor may comprise a shaft defining a longitudinal axis, a Y-axis extending upwardly and orthogonally from the longitudinal axis, and an X-axis extending orthogonally to the longitudinal axis, and the Y-axis. A housing may define a first longitudinal end, a second longitudinal end, and a cavity that extends from the first longitudinal end to the second longitudinal end. A plurality of mechanical components including one hydraulic interacting components may be disposed in the cavity, and a manifold cap may be attached to the second longitudinal end that defines an inlet and an outlet. The shaft may extend from the cavity past the first longitudinal end of the housing, and a mounting flange may be disposed at the first longitudinal end of the housing. The mounting flange may define a pair of bolt receiving slots that are disposed along the X-axis on either side of the shaft, the pair of bolt receiving slots may each define a radius center that are spaced away from each other a X dimension, and a Y-dimension that defines a width of the slot. A ratio of the X-dimension to the Y-dimension may range from 9.5 to 9.8.

A hydraulic fan motor pump assembly according to an embodiment of the present disclosure may comprise a shaft defining a longitudinal axis, a Y-axis extending upwardly and orthogonally from the longitudinal axis, and an X-axis extending orthogonally to the longitudinal axis, and the Y-axis. A housing may define a first longitudinal end, a second longitudinal end, and a cavity that extends from the first longitudinal end to the second longitudinal end. A plurality of mechanical components including at least one hydraulic driven component may be disposed in the cavity. A manifold cap may be attached to the second longitudinal end that defines an inlet and an outlet. The shaft may extend from the cavity past the first longitudinal end of the housing, and a mounting flange may be disposed at the first longitudinal end of the housing. The mounting flange may define a pair of bolt receiving slots that are disposed along the X-axis on either side of the shaft, the pair of bolt receiving slots may each define a radius center that are spaced away from each other a X dimension. A pilot projection may extend longitudinally away from the mounting flange, defining a pilot projection diameter, and a ratio of the X dimension to the pilot projection diameter may ranges from 1.1 to 1.5.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
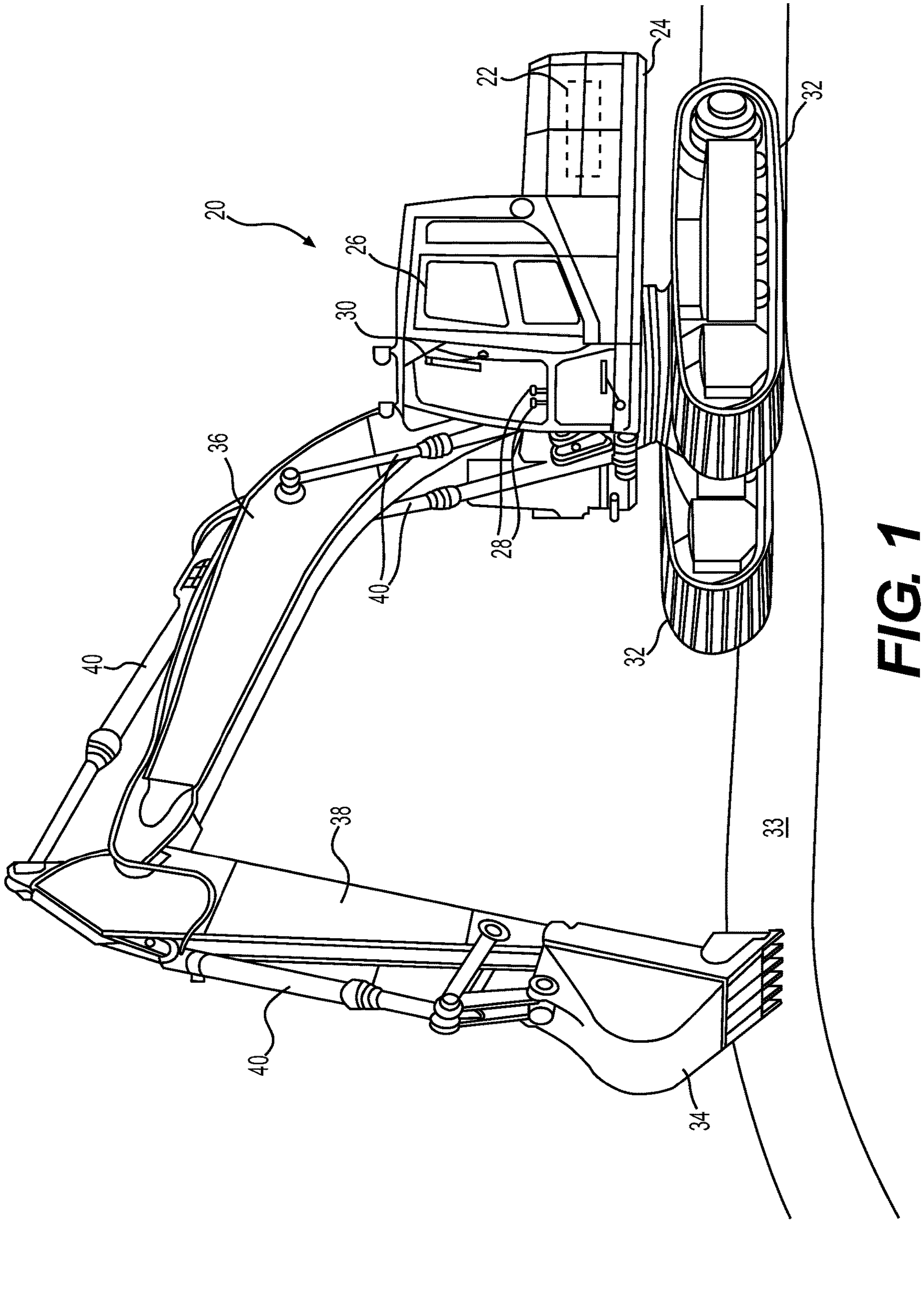
FIG. 1 is a perspective view of a hydraulic excavator that may use an engine that employs a hydraulic pump or motor having a mounting configuration for handling increased torque according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of hydraulic pump or motor assembly, a hydraulic fan motor assembly, and an engine assembly that are constructed according to various embodiments of the present disclosure will be discussed that may break the aforementioned compromise between the size/cost of a pump or motor and the output/input of the torque to increase the cooling capacity of the engine will be discussed momentarily. Now, an exemplary machine that may employ the embodiments such as a hydraulic excavator will be discussed first with the understanding that any suitable machine including an electromotive diesel engine, a bulldozer, or other heavy equipment used in the marine, earth moving, construction, and mining industries may use these embodiments.

Starting with FIG. 1, such a work machine 20 is shown that may include an engine 22 configured to supply power to the machine, such as but not limited to, a diesel engine, a gasoline internal combustion engine, a natural gas engine, an electric motor, and other known power generating sources or combinations thereof. Moreover, an embodiment of the machine 20 includes a frame 24 which provides support to the engine 22, an operator compartment 26 and other such components of the work machine 20. Furthermore, the operator compartment 26 defines a fully enclosed area, or in some cases semi-enclosed, for an operator of the machine 20 to sit and/or stand in while operating the machine. 20.

Additionally, the operator compartment 26 is generally configured to include a set of operational controls 28, such as but not limited to a joystick, foot pedal, lever, steering wheel and other such controls. The operational controls 28 are manipulated by the operator to control and maneuver the work machine 20. In some embodiments, the operator compartment 26 further includes one or more visual displays 30 which display or otherwise communicate information to the operator of the machine 20.

The work machine 20 further includes a set of ground 15 engaging elements 32 operatively coupled to the frame 24. One non-limiting example of the machine 20 includes ground engaging elements 32 configured as a set of tracks; however, wheels or other such propulsion elements are possible. The ground engaging elements 32 are driven by the engine 22 to propel the work machine 20 in a direction of ravel. Moreover, the ground engaging elements 32 may be operably coupled to one or more of the operational controls 28 such that the ground engaging elements 32 are actively controlled to propel and maneuver the work machine 20 around the work site 33.

Also, the work machine 20 may include at least one work tool 34, such as but not limited to, a bucket, drill, saw, forklift, hammer, auger, grapple, or other such tool operably attached to the frame 24 or other portion of the work machine 20. In one non-limiting example the work tool 34 is coupled to the frame 24 by a boom 36 and actuating arm 38. The boom 36 and actuating arm 38 include one or more actuation cylinders 40 that are configured to raise, lower, dig, dump, or perform another such action of the work tool 34.

Figure 2:
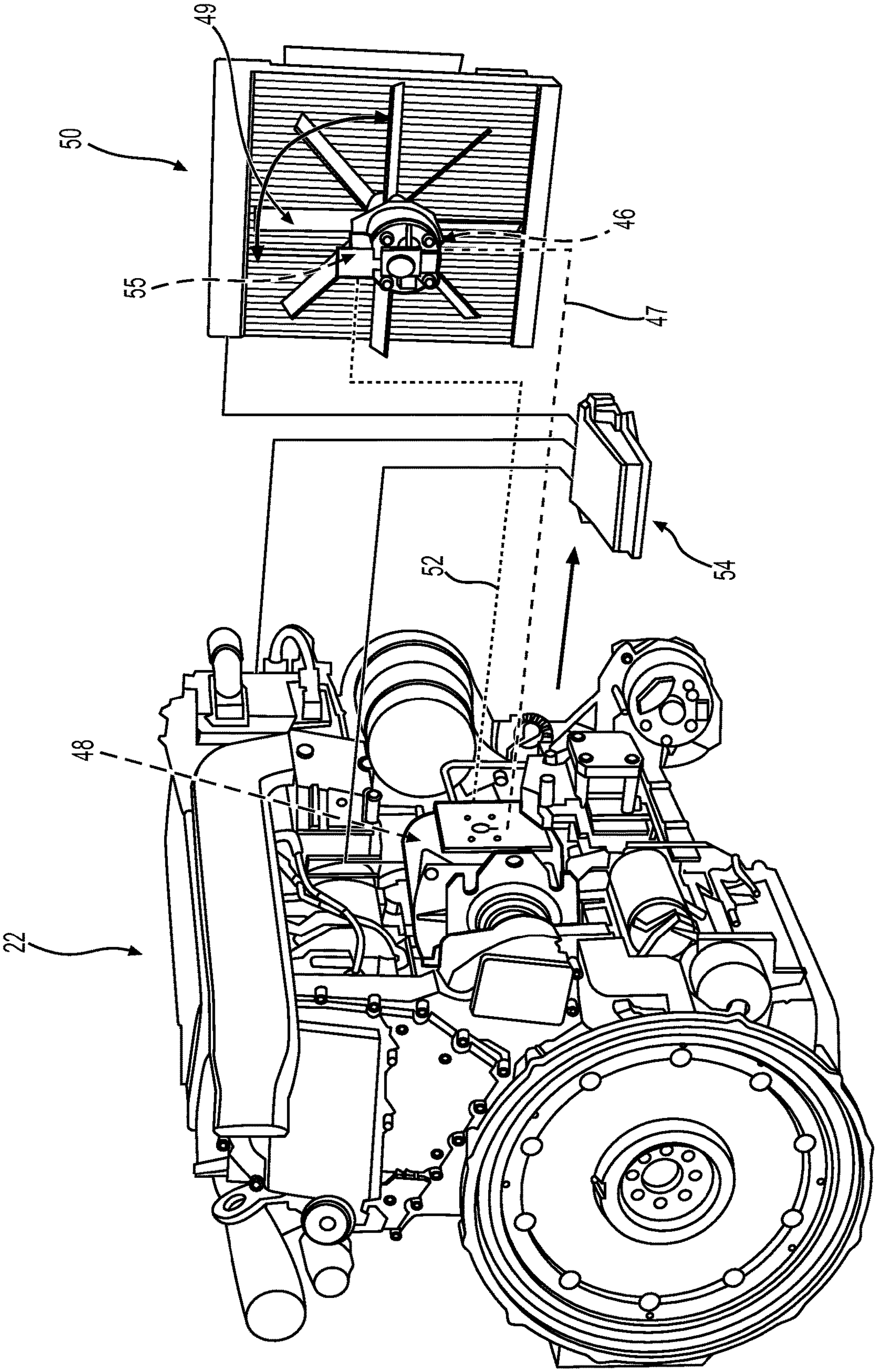
FIG. 2 is a schematic view of the engine of the excavator of FIG. 1 shown by itself, illustrating the engine hydraulic pump powering the hydraulic fan motor.

Turning now to FIG. 2, the details of the engine may be more clearly seen. The engine 22 includes a main hydraulic pump 48 that supplies pressurized hydraulic fluid/oil (via hydraulic line(s) 47) to the hydraulic fan motor assembly 46, that powers the fan 49 to draw air through the radiator assembly 50, where coolant is cooled and supplied to the cooling system of the engine (via cooling line(s) 52). An ECU 54 (electronic control unit) is also provided that is in communication with the various systems of the engine 22 including the hydraulic and cooling systems. In particular, one or more valve(s) 55 may be provided with the hydraulic fan motor assembly for controlling its operation.

Figure 3:
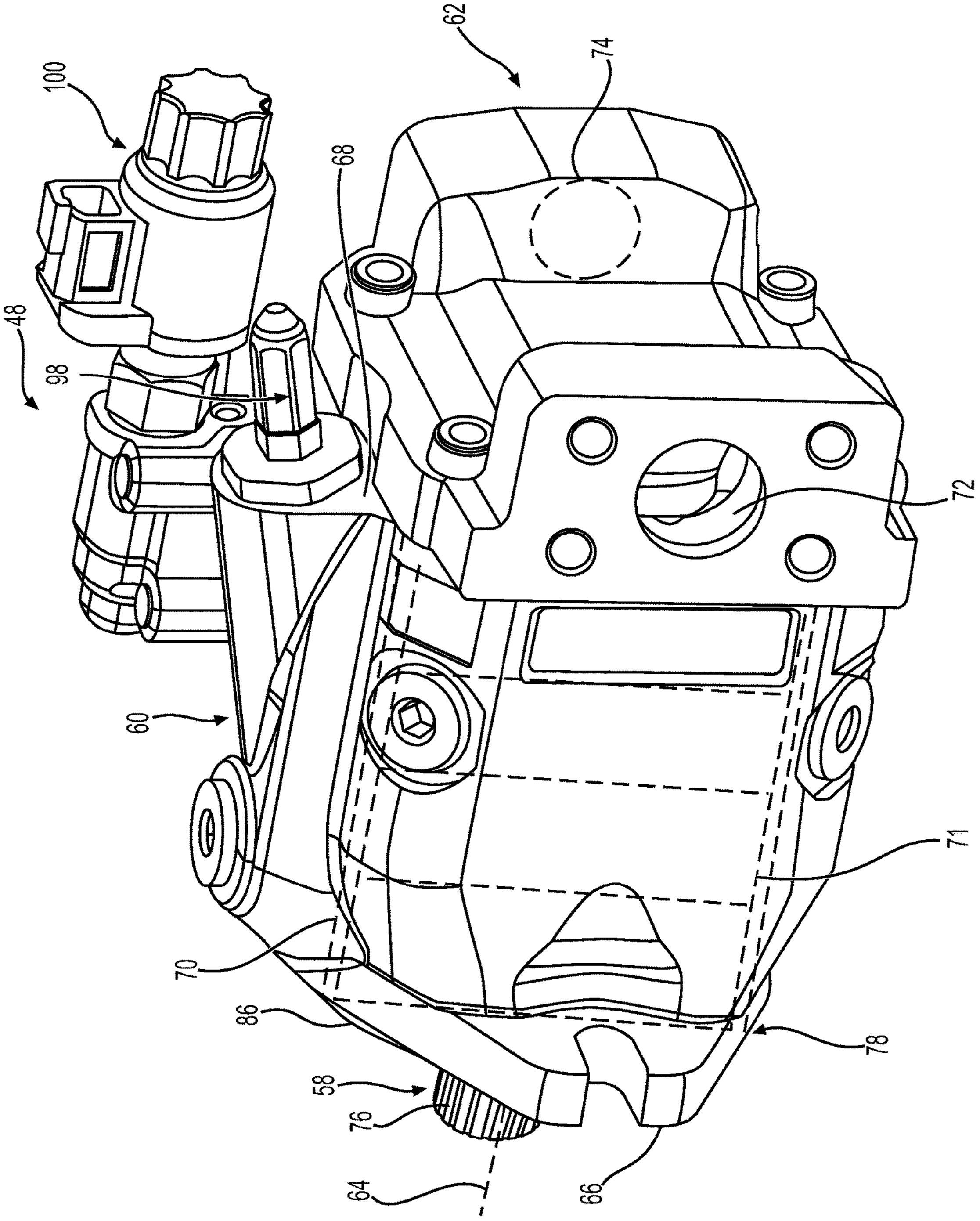
FIG. 3 is a perspective view of hydraulic fan pump of FIG. 2 shown in isolation.
Figure 4:
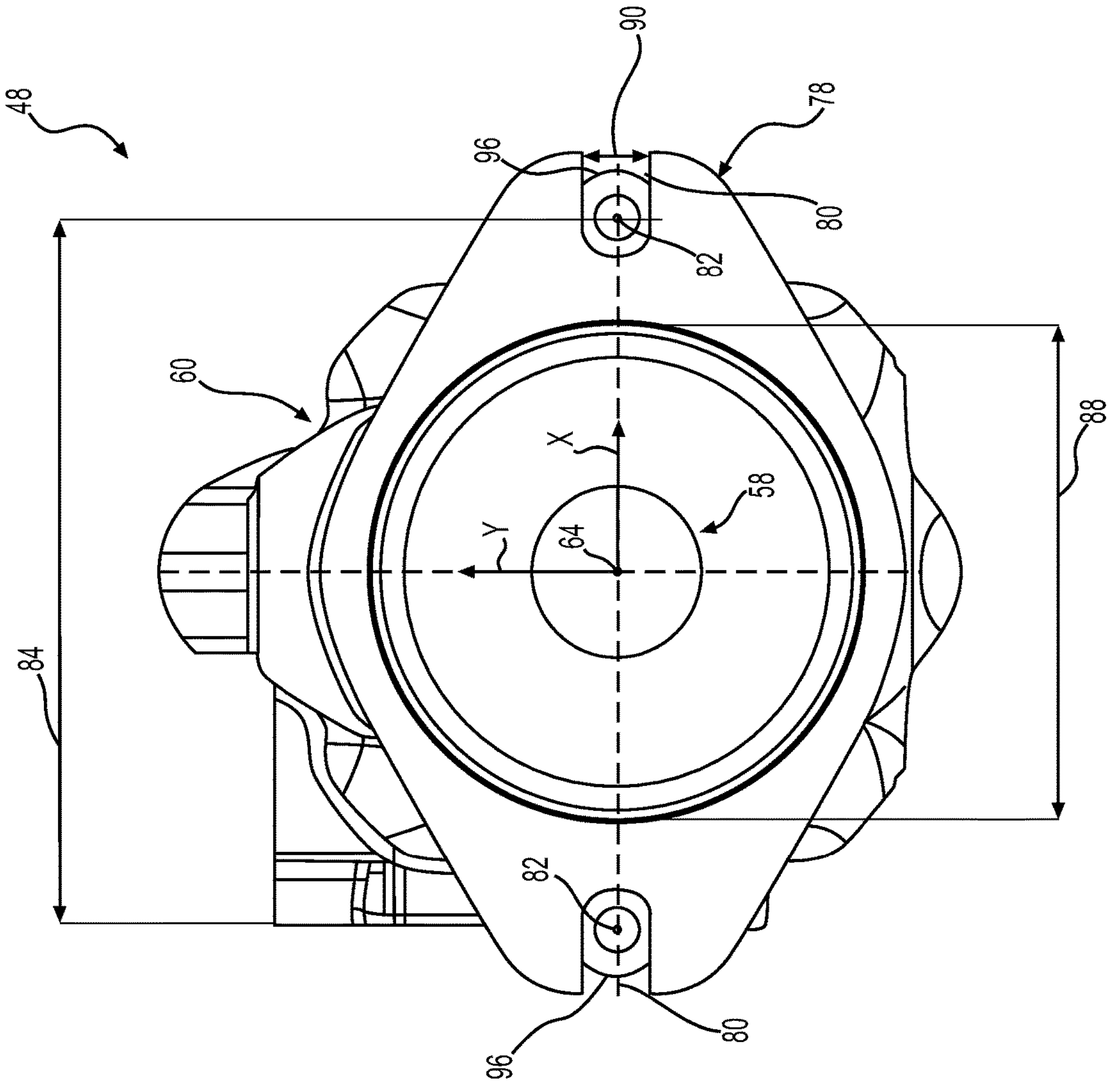
FIG. 4 is a left side view of the hydraulic fan pump of FIG. 3, depicting its mounting flange, bolt slots, and pilot ring.

Referring now to FIGS. 3 and 4, details of the hydraulic fan pump assembly 48 may be more easily seen including a shaft 58, a housing 60, and a manifold cap 62.

The shaft 58 may include a body of revolution (e.g., cylindrical, conical, etc.) defining a longitudinal axis 64 (see FIG. 3), a Y-axis extending upwardly and orthogonally from the longitudinal axis 64 (see FIG. 4), and an X-axis extending orthogonally to the longitudinal axis, and the Y-axis.

As shown in FIG. 3, the housing 60 may define a first longitudinal end 66, a second longitudinal end 68, and a cavity 70 (shown by hidden lines) that extends from the first longitudinal end 66 to the second longitudinal end 68. That is to say, the cavity 70 may have a portion that extends completely through the body of the housing 60. A plurality of mechanical components (see lines 71) including at least one hydraulically driven component may be disposed in the cavity 70 of the housing 60. Examples of these components may include at least one of the following: a vane, a piston, and a swash plate, etc.

The manifold cap 62 may be attached (e.g., via fasteners) to the second longitudinal end 68, and may define an inlet 72 and an outlet 74 (see FIG. 3). The shaft 58 may extend from the cavity 70 of the housing 60, and past the first longitudinal end 66 of the housing 60.

In operation for a motor, the hydraulic fluid/oil enters the inlet and drives the internal components of the motor, and then exits the outlet. The internal components of the motor are mechanically coupled to the shaft, which then rotates. The end of the shaft interfaces with the hub of the fan, or another component that is mechanically coupled to the hub, to drive the fan. This reverse is true for the operation of a pump. The shaft of the pump may be powered by the engine, which in turn rotates the internal components of the pump creating hydraulic pressure and flow. One example of part of such an interface between the engine and the pump is shown in FIG. 3 as an exposed free end of the shaft 58 that includes teeth 76. Other types of interfaces are possible in other embodiments of the present disclosure including splines, press fits, fastening, etc.

Focusing now on FIG. 4, a mounting flange 78 may be disposed at the first longitudinal end 66 of the housing, defining a pair of bolt receiving slots 80 that are disposed along the X-axis on either side of the shaft 58. The pair of bolt receiving slots 80 may each define a radius center 82 that are spaced away from each other an X dimension 84 (i.e., the dimension is measured along the X-axis), and a pilot projection 86 that extends longitudinally away from the mounting flange 78, for receiving the pilot cavity 87 of the fan assembly 50 (see FIG. 5).

Looking at FIG. 4, the pilot projection 86 may define a pilot projection diameter 88, and a ratio of the X dimension 84 to the pilot projection diameter 88 may range from 1.1 to 1.5 (e.g., 1.3) in some embodiments of the present disclosure. In such a case, each of the pair of bolt receiving slots 80 defines a Y dimension 90, and a ratio of the X dimension 84 to the Y-dimension 90 may range from 9.5 to 9.8 (e.g., 9.67) for some embodiments of the present disclosure.

The hydraulic fan motor may have a capacity of 25/50 cc/rev, when the X dimension 84 ranges from 148.0 mm to 152.0 mm (e.g., 150.0 mm), the Y dimension 90 ranges from 15.0 mm to 16.0 mm (e.g., 15.5 mm), and the pilot projection diameter 88 ranges from 112.0 mm to 115.0 mm (e.g., 113.45 mm). Other capacities and dimensions are possible in other embodiments of the present disclosure.

Figure 5:
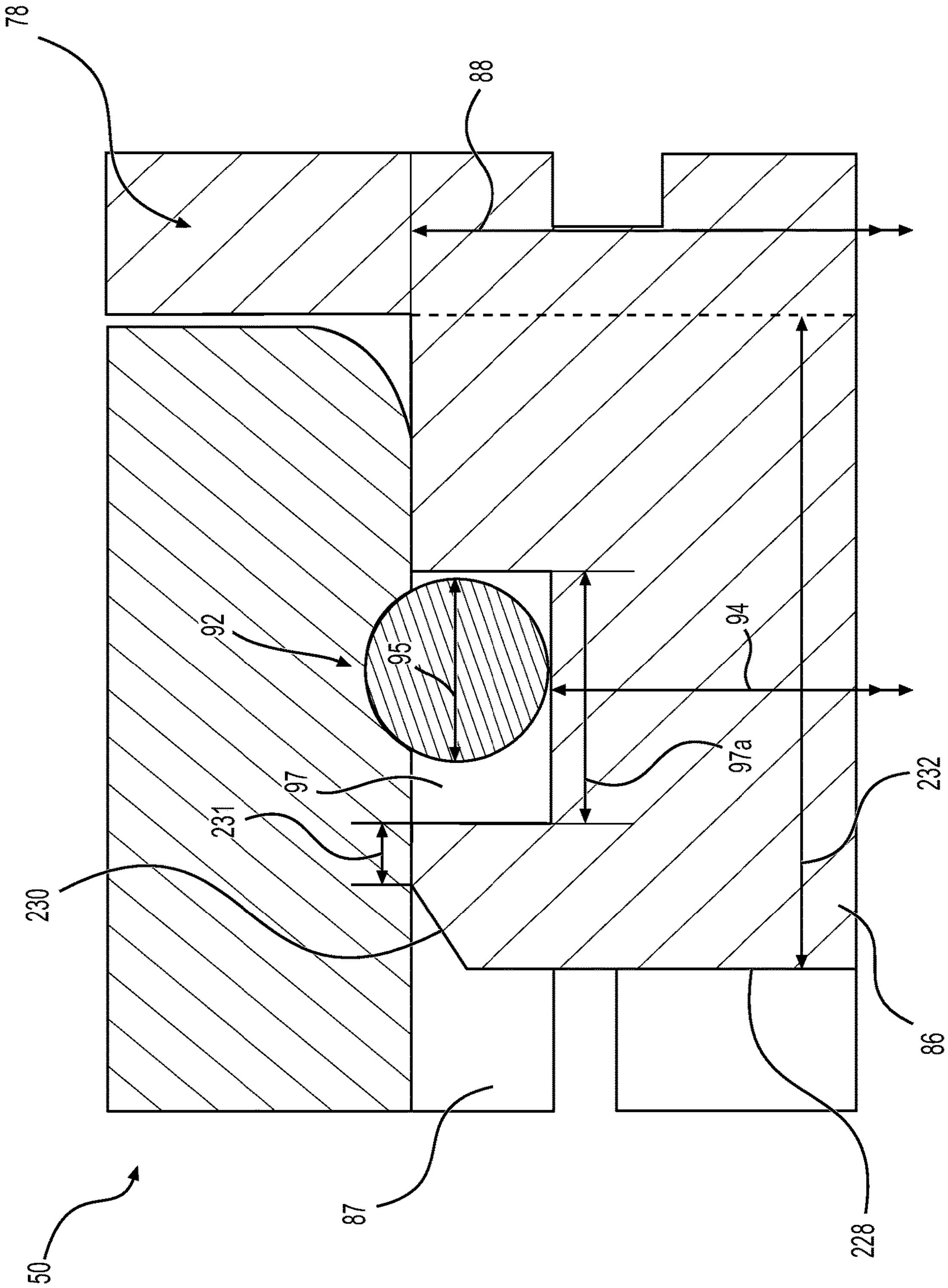
FIG. 5 is a front sectional view of the hydraulic fan pump of FIG. 3, showing an O-ring in a slot that extends circumferentially about the periphery of the pilot projection.

When such dimensions and capacities are present, the shaft 58 may transmit more than 500 n/m (newton meters) of torque. As best seen in FIG. 5, an O-ring 92 may also be provided that is configured to fit into the pilot projection 86. This O-ring 92 may define an inner diameter 94 that ranges from 104.0 mm to 108.0 mm (e.g., 107.62 mm). Moreover, the cross-sectional diameter 95 of the O-ring 92 may be less than the width 97*a* of seal receiving groove 97 that extends circumferentially about the periphery of the pilot projection 86.

As shown in FIG. 5, the pilot projection 86 may be unitary, requiring that the O-ring 92 be expanded and slide over the free end of the pilot projection until it is seated into the groove 97. However, it is contemplated that the pilot projection 86 may be split at the groove 97 (along the radial direction, splitting the projection into two parts) in other embodiments to ease the installation of the O-ring 92. In such an embodiment, the end portion of the pilot projection would be fastened to the rest of the pilot projection after the O-ring 92 has been installed in the groove 97.

To help withstand the increased torque, a pair of M14 bolts 96 (see FIG. 4) may each pass longitudinally through each of the pair bolt receiving slots 80 for attaching the pump to the fan assembly. Also, a displacement control valve or a displacement limiting mechanism 98 (see FIG. 3) may be attached to the housing 60 that is in fluid communication with the cavity 70 and/or the inlet or outlet of the manifold cap 62 in some embodiments but not others.

Similarly, a solenoid valve assembly 100 may also be attached to the housing 60 that is in fluid communication with the cavity 70 and/or the manifold cap 62 to control the operation of the motor.

The housing and manifold cap may be cast or molded from any suitable material including, but not limited to, steel, aluminum, iron, and thermoplastics.

Any of the dimensions, configurations, materials, etc. discussed herein may be varied as needed or desired to be different than any value or characteristic specifically mentioned herein or shown in the drawings for any of the embodiments.

A hydraulic pump or motor with a mounting configuration for mating with a female mounting member to provide an assembly to accommodate increased torque as already alluded to earlier herein will now also be discussed. It is to be understood that this assembly may have the features, properties, dimensions, and ratios of the previous assembly mentioned herein even if not explicitly shown in the drawings.

Figure 6:
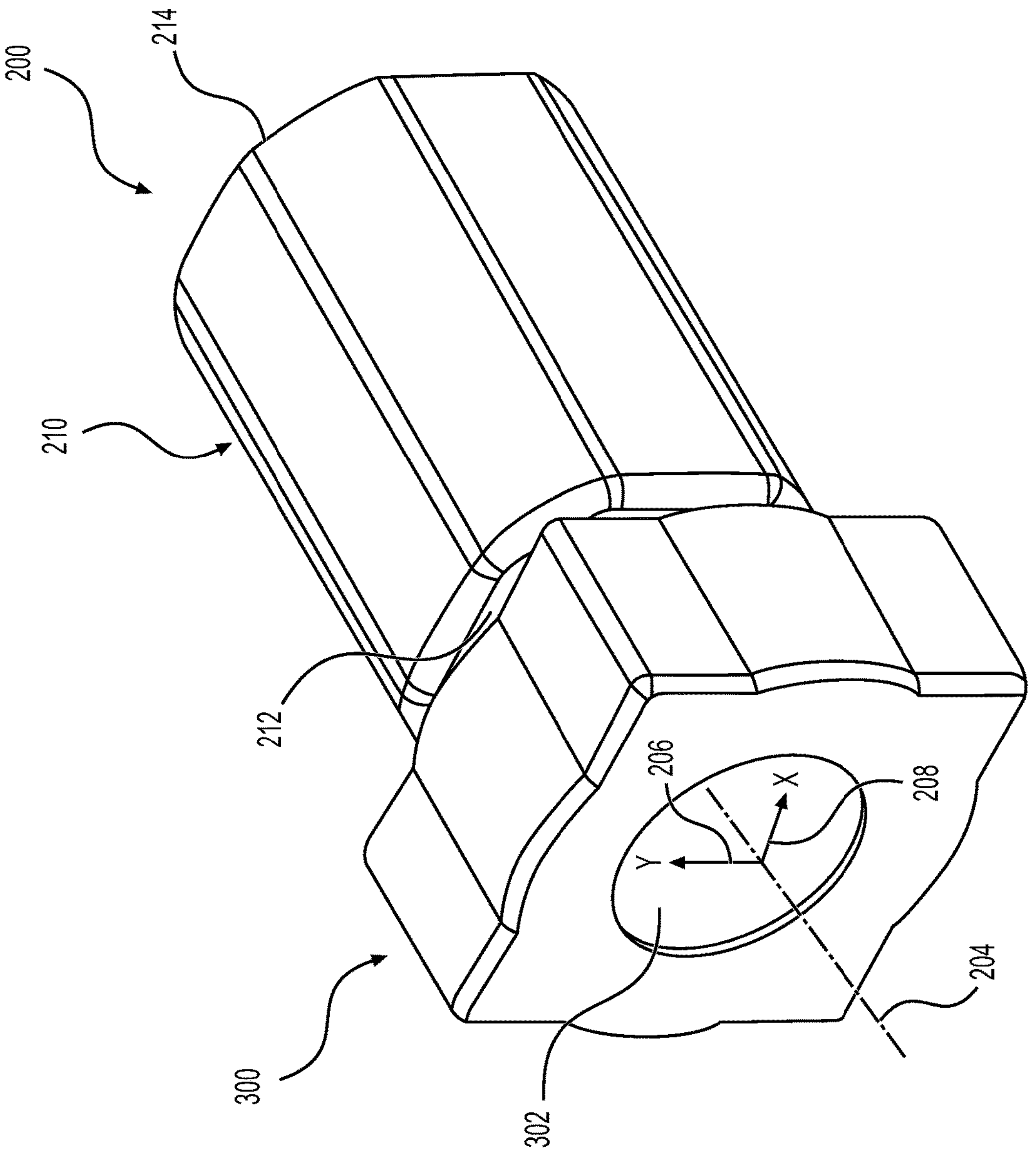
FIG. 6 is a perspective view of a hydraulic fan pump according to another embodiment of the present disclosure mating with a female mounting member.
Figure 7:
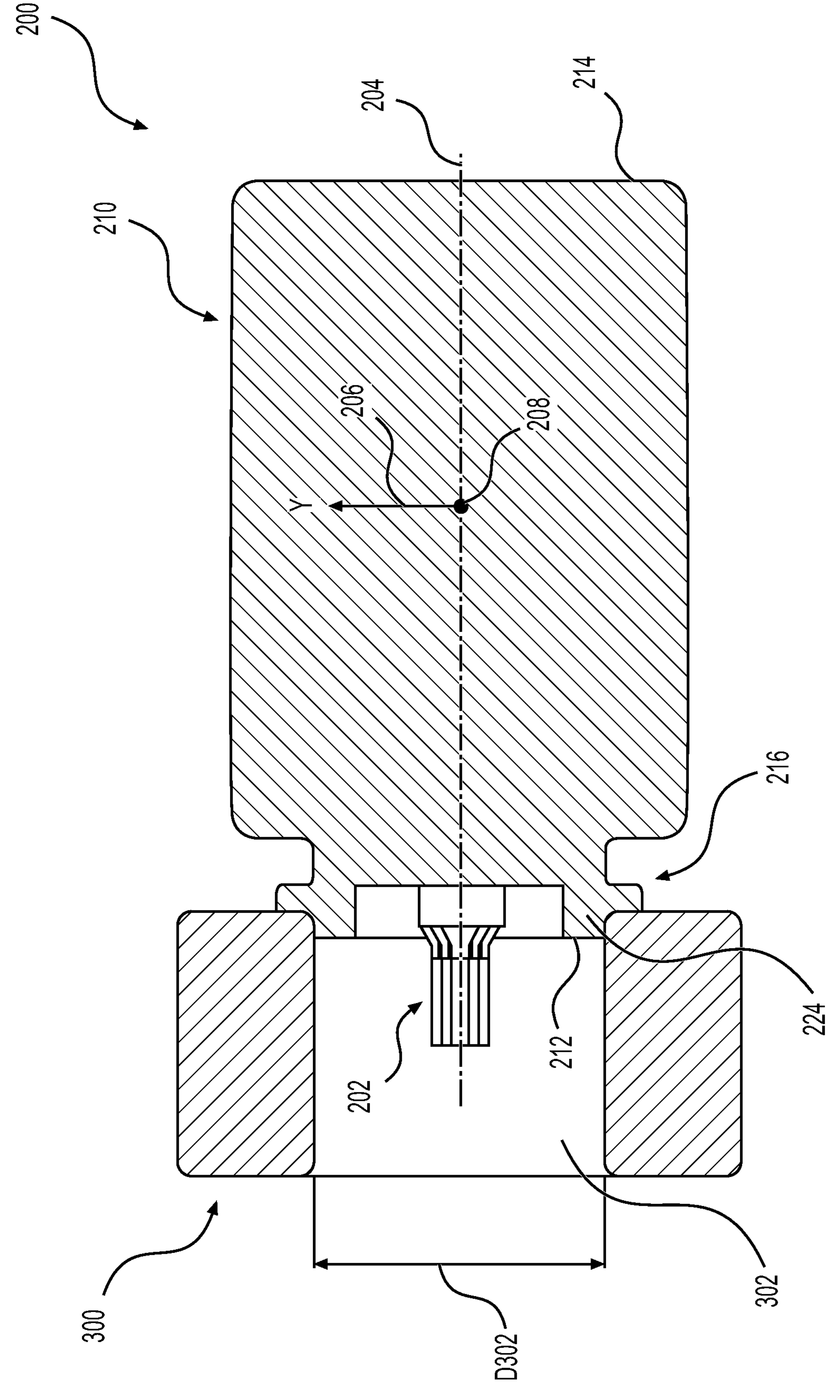
FIG. 7 is sectional side view of the hydraulic fan pump and female mounting member of FIG. 6.
Figure 8:
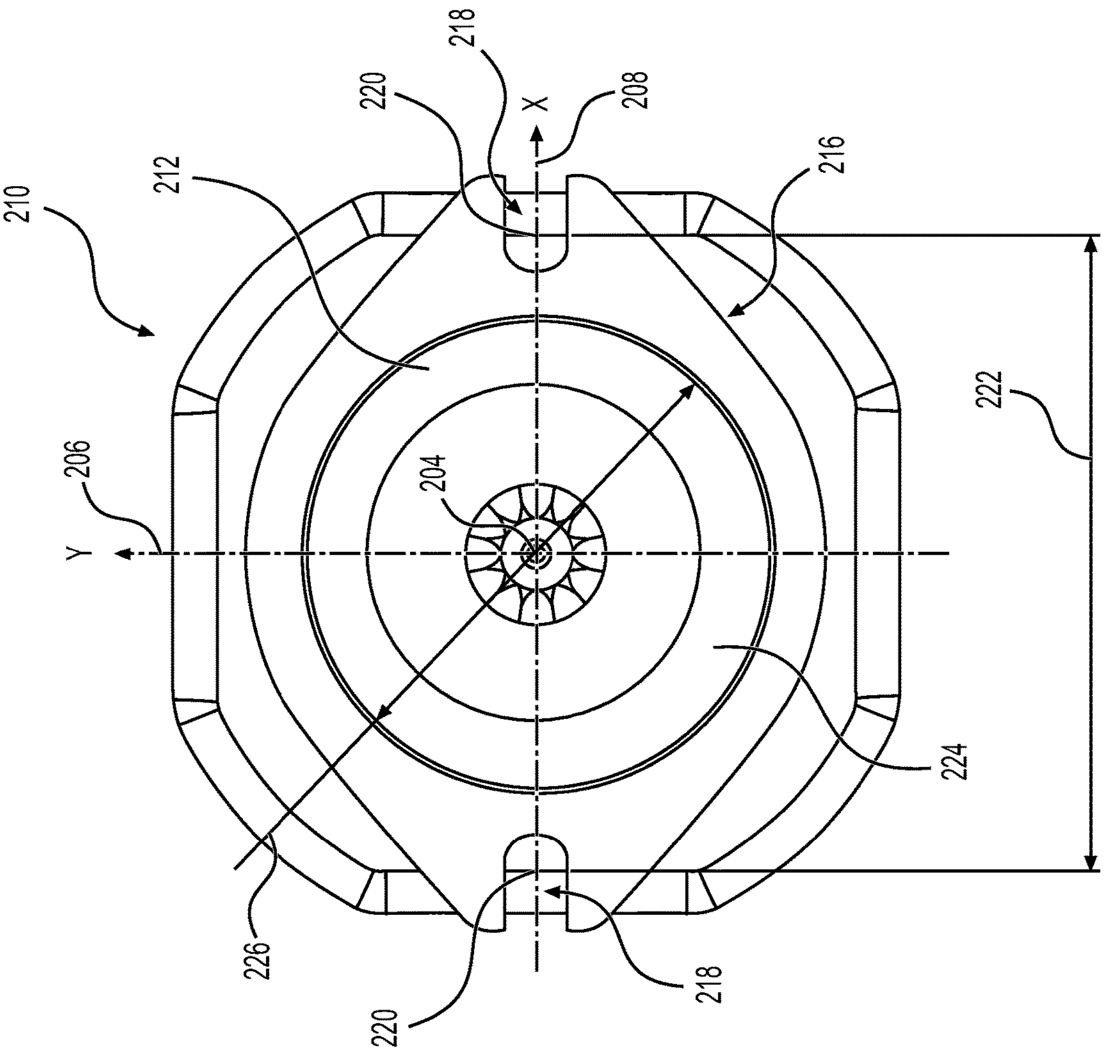
FIG. 8 is a left-side view of the hydraulic fan pump of FIG. 6 shown without the female mounting member.

As seen in FIGS. 6 thru 8, the assembly 200 may comprise a shaft 202 defining a longitudinal axis 204, a Y-axis 206 extending upwardly and orthogonally from the longitudinal axis 204, and an X-axis 208 extending orthogonally to the longitudinal axis 204, and the Y-axis 206.

A housing 210 may define a first longitudinal end 212, and a second longitudinal end 214. Though not shown in FIGS. 6 thru 8, it is to be understood that a cavity that extends from the first longitudinal end 212 toward the second longitudinal end 214 may be present that contains a plurality of mechanical components including one hydraulic interacting component such as shown and described previously with respect to FIG. 3.

Looking at FIG. 7, the shaft 202 extends from the cavity past the first longitudinal end 212 of the housing 210, and a mounting flange 216 may be disposed at the first longitudinal end 212.

As best seen in FIG. 8, the mounting flange 216 may define a pair of bolt receiving slots 218 that are disposed along the X-axis on either side of the shaft 202. The pair of bolt receiving slots 218 each define a radius center 220 that are spaced away from each other a X dimension 222, and a pilot projection 224 may extend longitudinally away from the mounting flange 216, defining a pilot projection diameter 226. A ratio of the X dimension 222 to the pilot projection diameter 226 ranges from 1.1 to 1.5.

The housing 210 may be attached to a female mounting member 300 that defines a pilot projection receiving cavity 302 that mates with the pilot projection 224 (see FIG. 7). As understood in FIG. 9, a first threaded hole 304 that is aligned with a radius center 220 during assembly, and a second threaded hole 304*a* that is aligned with a radius center 220 during assembly for receiving the fasteners as described earlier herein.

In some embodiments, a ratio of the X dimension to the pilot projection receiving cavity also ranges from 1.1 to 1.5. In such a case, the hydraulic pump or motor may have a capacity of 25/50 cc/rev, the X dimension may range from 148.0 mm to 152.0 mm, and the pilot projection diameter may range from 112.0 mm to 115.0 mm. This may allow the shaft to receive or deliver more than 500 N/m of torque. Other ranges of ratios and dimensions may be used in other embodiments of the present disclosure to allow a different amount of torque capacity, etc.

Referring back to FIG. 5, either embodiment may have a pilot projection 86 that defines a free end 228, and an O-ring groove (e.g., see 97) that is spaced longitudinally away from the free end 228. A chamfer 230 may extend from the free end 228 toward the O-ring groove. This chamfer 230 may be spaced away a minimum longitudinal distance 231 from the O-ring groove that ranges from 1.0 mm to 1.4 mm (e.g., 1.2 mm). The O-ring groove (e.g., see 97) may define a groove diameter (e.g., see 94) that ranges from 108.0 mm to 111.0 mm (e.g., 109.5 mm), and a groove axial width (e.g., see 97*a*) that ranges from 3.4 mm to 3.7 mm (e.g., 3.58 mm). Once assembled, the O-ring may be disposed in the O-ring groove to help prevent leaks. The pilot projection may define an overall longitudinal length 232 that ranges from 10.0 mm to 11.0 mm (e.g., 10.5 mm).

Again, any of the embodiments discussed herein may use a different set of materials, features, ranges of ratios, or dimensions, as compared to what has been specifically discussed herein.

INDUSTRIAL APPLICABILITY

In practice, an engine assembly, a hydraulic fan motor assembly, a female mounting member, and/or a hydraulic pump assembly constructed according any embodiment disclosed herein may be sold, bought, manufactured or otherwise obtained in an OEM (original equipment manufacturer) or after-market context. In some cases, various components, of the engine assembly, hydraulic fan motor assembly, and the hydraulic pump assembly, etc. may be provided as a kit to repair or retrofit a machine in the field.

Moreover, embodiments of a hydraulic pump or hydraulic motor that may fit into existing engines and/or machines, unexpectedly breaking the size/cost versus torque (and cooling efficiency) compromise discussed earlier herein will now be discussed in detail with reference to FIGS. 3 and 4.

It is to be understood that components of a motor may also be used as a pump by reversing the flow of hydraulic fluid and pressuring the fluid by supplying torque to the shaft, instead of receiving torque from the shaft.

Such a hydraulic pump or hydraulic motor according to an embodiment of the present disclosure (e.g., hydraulic fan motor assembly 48) may include a shaft 58, a housing 60, and a manifold cap 62 as previously described herein.

A plurality of mechanical components including one hydraulic interacting component (e.g., see lines 71) that are disposed in the housing (e.g., a piston, a vane, a swash plate, etc.).

The mounting flange 78 may define a pair of bolt receiving slots that are disposed along the X-axis on either side of the shaft, the pair of bolt receiving slots 80, and each may define a radius center 82 that are spaced away from each other a X dimension 84. A pilot projection 86 may extend longitudinally away from the mounting flange 78, defining a pilot projection diameter 88, and a ratio of the X dimension 84 to the pilot projection diameter 88 may range from 1.1 to 1.5 (e.g., 1.3) in some embodiments of the present disclosure.

Also, a ratio of the X dimension 84 to the Y-dimension 90 may range from 9.6 to 9.8 (e.g., 9.67) in some embodiments of the present disclosure. The hydraulic pump or motor has a capacity of 25/50 cc/rev, the X dimension 84 may range from 148.0 mm to 152.0 mm (e.g., 150.0 mm), the Y dimension 90 may range from 15.0 mm to 16.0 mm (e.g., 15.5 mm), and the pilot projection diameter 88 may range from 112.0 mm to 115.0 mm (e.g., 113.45 mm).

As a result of this configuration, the shaft 58 may be able to receive or deliver more than 500 n/m of torque.

Such a hydraulic pump or hydraulic motor according to yet another embodiment of the present disclosure (e.g., hydraulic fan motor assembly 48) may include a shaft 58, a housing 60, and a manifold cap 62 as previously described herein.

This embodiment may be further characterized in that a ratio of the X-dimension 84 to the Y-dimension 90 may range from 9.5 to 9.8 (e.g., 9.67), while a ratio of the pilot projection diameter 88 to the Y-dimension 90 may range from 7.3 to 7.5 (e.g., 7.4).

In such an embodiment, the hydraulic pump or motor may have a capacity of 25/50 cc/rev, the X dimension may range from 148.0 mm to 152.0 mm, the Y dimension 90 may range from 15.0 mm to 16.0 mm, and the pilot projection diameter may range from 112.0 mm to 115.0 mm as already described herein.

This embodiment too may have a shaft 58 that is capable of receiving or delivering more than 500 n/m of torque.

In addition, the female mounting member may be supplied as a replacement part. It is to be understood that the features of the female mounting member may be swapped with the corresponding features of the housing, and vice versa in various other embodiments of the present disclosure.

Figure 9:
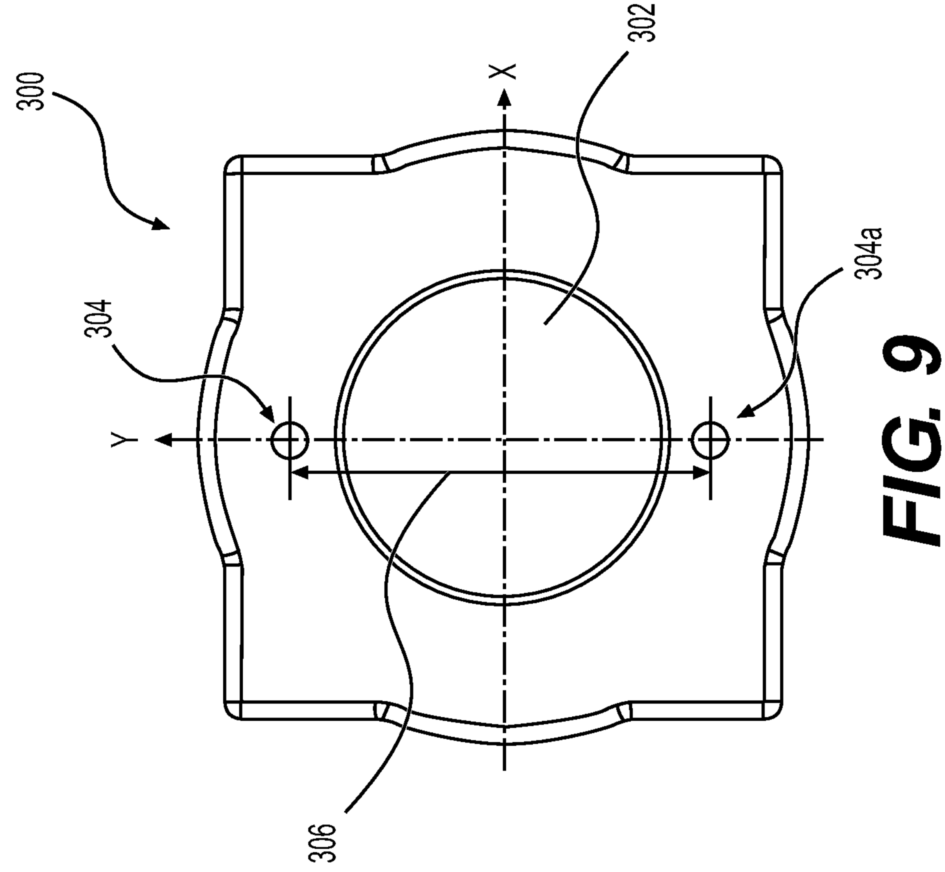
FIG. 9 is a right-side view of the female mounting member of FIG. 6 shown without the pump.

Such a female mounting member may be described as follows looking at FIGS. 9 and 10. The female mounting member may include a body that defines a projection receiving cavity 302 defining a cavity diameter D302, and a first threaded hole 304 defining a first threaded hole diameter D304. A ratio of the cavity diameter D302 to the first threaded hole diameter D304 may range from 8.0 to 8.15.

In such an embodiment, the cavity diameter D302 may range from 112.0 mm to 115.0 mm (e.g., 114.0 mm), and the first threaded hole diameter D304 may range from 13.0 mm to 15.0 mm (e.g., 14.0 mm).

Figure 10:
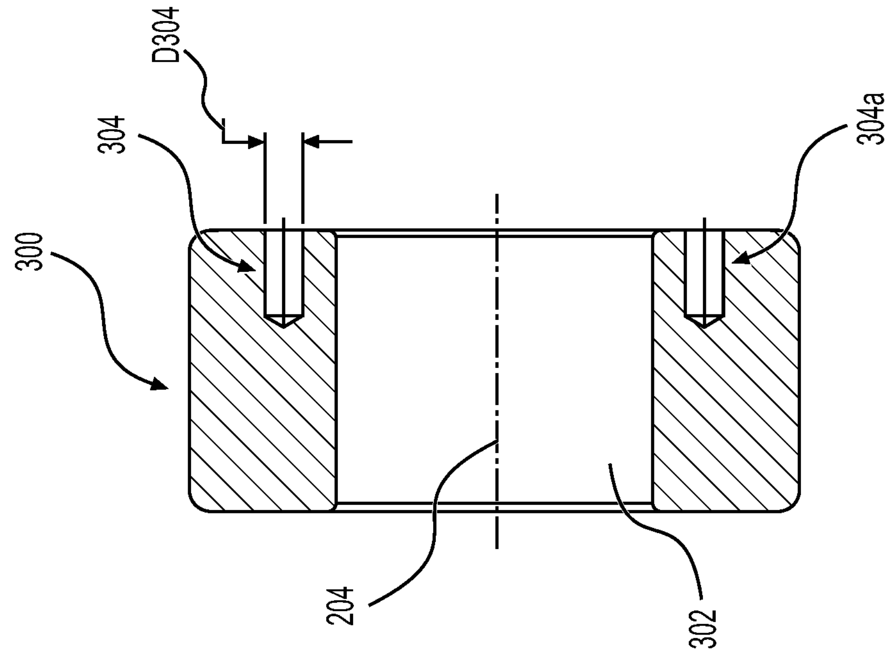
FIG. 10 is a sectional view of the female mounting member of FIG. 9.

As shown in FIG. 10, the cavity 302 may extend completely through the body, but not necessarily so.

In particular embodiments, the first threaded hole 304 is a M14 tapped hole with a 30.0 mm depth. This may not be the case for other embodiments of the present disclosure. A second threaded hole 304*a* (may be similarly or identically configured as the first threaded hole) may be spaced away a center-to-center minimum distance 306. A ratio of the center-to center minimum distance to the cavity diameter D302 may range from 1.30 to 1.35 in some embodiments of the present disclosure. In such a case, the center-to-center minimum distance 306 may range from 140.0 mm to 160.0 mm (e.g., 148.0 mm to 152.0 mm with a nominal value at 150.0 mm).

Any of the aforementioned features may be differently configured or have different ranges of ratios and dimensions than what has been described. The female mounting member may be made from any suitable material as previously described herein with respect to the housing, etc.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A hydraulic pump or motor with a mounting configuration for transferring torque, comprising:

a shaft defining a longitudinal axis, a Y-axis extending upwardly and orthogonally from the longitudinal axis, and an X-axis extending orthogonally to the longitudinal axis, and the Y-axis;

a housing defining a first longitudinal end, a second longitudinal end, and a cavity that extends from the first longitudinal end to the second longitudinal end;

a plurality of mechanical components including one hydraulic interacting component that are disposed in the cavity; and a manifold cap attached to the second longitudinal end that defines an inlet and an outlet;

wherein a mounting flange is disposed at the first longitudinal end of the housing, the shaft extends from the cavity past the first longitudinal end of the housing and through the mounting flange, the mounting flange defining a pair of bolt receiving slots that are disposed along the X-axis on either side of the shaft, the pair of bolt receiving slots each define a radius center that are spaced away from each other a X dimension, the mounting flange further defines a pilot projection comprising an O-ring groove arranged along a length of the pilot projection and facing laterally to receive an O-ring, the pilot projection configured for aligning the pump or motor with a recess in an adjoining device and sealing a joint between the pump or motor and the adjoining device against passage of fluid, the pilot projection extending longitudinally away from the mounting flange, defining a pilot projection diameter, and a ratio of the X dimension to the pilot projection diameter ranges from 1.1 to 1.5.

2. The hydraulic pump or motor with a mounting configuration for transferring torque of claim 1, wherein each of the pair of bolt receiving slots defines a Y dimension, and a ratio of the X dimension to the Y dimension ranges from 9.6 to 9.8.

3. The hydraulic pump or motor with a mounting configuration for transferring torque of claim 2, wherein the X dimension ranges from 148.0 mm to 152.0 mm, the Y dimension ranges from 15.0 mm to 16.0 mm, and the pilot projection diameter ranges from 112.0 mm to 115.0 mm.

4. The hydraulic pump or motor with a mounting configuration for transferring torque of claim 3, wherein the shaft receives or delivers more than 500 n/m of torque.

5. The hydraulic pump or motor with a mounting configuration for transferring torque of claim 1, wherein the plurality of mechanical components including one hydraulic interacting component that are disposed in the housing includes at least one of the following:

a vane, a piston, and a swash plate.

6. A hydraulic pump or motor with a mounting configuration for transferring torque, comprising:

a shaft defining a longitudinal axis, a Y-axis extending upwardly and orthogonally from the longitudinal axis, and an X-axis extending orthogonally to the longitudinal axis, and the Y-axis;

a housing defining a first longitudinal end, a second longitudinal end, and a cavity that extends from the first longitudinal end to the second longitudinal end;

a plurality of mechanical components including one hydraulic interacting components that are disposed in the cavity; and a manifold cap attached to the second longitudinal end that defines an inlet and an outlet;

wherein a mounting flange is disposed at the first longitudinal end of the housing, the shaft extends from the cavity past the first longitudinal end of the housing and through the mounting flange, the mounting flange defining a pair of bolt receiving slots that are disposed along the X-axis on either side of the shaft, the pair of bolt receiving slots each define a radius center that are spaced away from each other a X dimension, and a Y-dimension that defines a width of the slot, and a ratio of the X-dimension to the Y-dimension ranges from 9.5 to 9.8, the mounting flange further defines a pilot projection comprising an O-ring groove arranged along a length of the pilot projection and facing laterally to receive an O-ring, the pilot projection configured for aligning the pump or motor with a recess in an adjoining device and sealing a joint between the pump or motor and the adjoining device against passage of fluid.

7. The hydraulic pump or motor with a mounting configuration for transferring torque of claim 6, the pilot projection defining a pilot projection diameter, and a ratio of the pilot projection diameter to the Y-dimension ranges from 7.3 to 7.5.

8. The hydraulic pump or motor with a mounting configuration for transferring torque of claim 7, wherein the X dimension ranges from 148.0 mm to 152.0 mm, the Y dimension ranges from 15.0 mm to 16.0 mm, and the pilot projection diameter ranges from 112.0 mm to 115.0 mm.

9. The hydraulic pump or motor with a mounting configuration for transferring torque of claim 8, wherein the shaft receives or delivers more than 500 n/m of torque.

10. The hydraulic pump or motor with a mounting configuration for transferring torque of claim 6, wherein the plurality of mechanical components including one hydraulic interacting component that are disposed in the housing includes at least one of the following:

a vane, a piston, and a swash plate.

11. A hydraulic fan pump assembly comprising:

a shaft defining a longitudinal axis, a Y-axis extending upwardly and orthogonally from the longitudinal axis, and an X-axis extending orthogonally to the longitudinal axis, and the Y-axis;

a housing defining a first longitudinal end, a second longitudinal end, and a cavity that extends from the first longitudinal end to the second longitudinal end;

a plurality of mechanical components including at least one hydraulic driven component that are disposed in the cavity; and a manifold cap attached to the second longitudinal end that defines an inlet and an outlet;

wherein a mounting flange is disposed at the first longitudinal end of the housing, the shaft extends from the cavity past the first longitudinal end of the housing and through the mounting flange, the mounting flange defining a pair of bolt receiving slots that are disposed along the X-axis on either side of the shaft, the pair of bolt receiving slots each define a radius center that are spaced away from each other a a X dimension, the mounting flange further defines a pilot projection comprising an O-ring groove arranged along a length of the pilot projection and facing laterally to receive an O-ring, the pilot projection configured for aligning the pump or motor with a recess in an adjoining device and sealing a joint between the pump or motor and the adjoining device against passage of fluid, the pilot projection extending longitudinally away from the mounting flange, defining a pilot projection diameter, and a ratio of the X dimension to the pilot projection diameter ranges from 1.1 to 1.5.

12. The hydraulic fan pump assembly of claim 11, wherein each of the pair of bolt receiving slots defines a Y dimension, and a ratio of the X dimension to the Y-dimension ranges from 9.5 to 9.8.

13. The hydraulic fan pump assembly of claim 12, wherein the X dimension ranges from 148.0 mm to 152.0 mm, the Y dimension ranges from 15.0 mm to 16.0 mm, and the pilot projection diameter ranges from 112.0 mm to 115.0 mm.

14. The hydraulic fan pump assembly of claim 13, wherein the shaft transmits more than 500 n/m of torque.

15. The hydraulic fan pump assembly of claim 11, wherein the plurality of mechanical components including the at least one hydraulically driven component that are disposed in the housing includes at least one of the following:

a vane, a piston, and a swash plate.

16. The hydraulic fan pump assembly of claim 11, wherein the O-ring defines an inner diameter that ranges from 104.0 mm to 108.0 mm.

17. The hydraulic fan pump assembly of claim 11, wherein, the shaft defines an exposed free end that includes teeth.

18. The hydraulic fan pump assembly of claim 11, further comprising a pair of M14 bolts that each pass longitudinally through each of the pair bolt receiving slots.

19. The hydraulic fan pump assembly of claim 11, further comprising a relief valve assembly that is attached to the housing.

20. The hydraulic fan pump assembly of claim 11, further comprising a solenoid valve assembly that is attached to the housing.

* * * * *